Dec. 24, 1929.  C. COSTAGANNA  1,740,576
AUTOMOBILE BUMPER
Filed Sept. 26, 1928
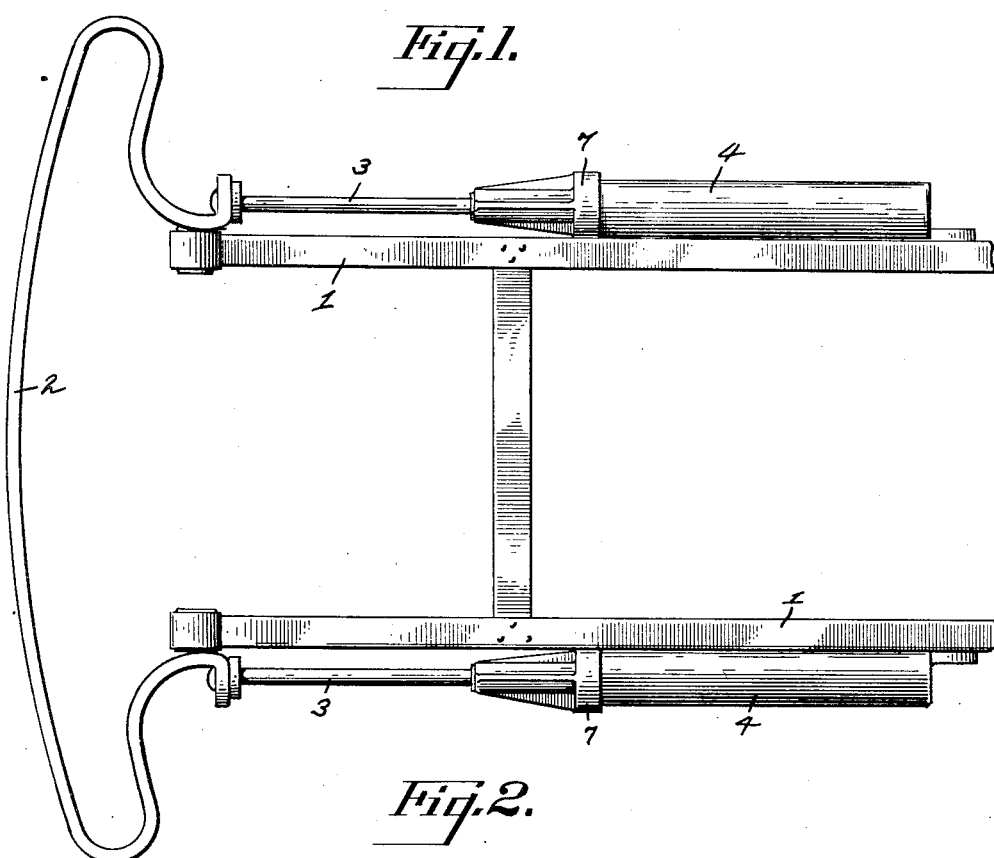
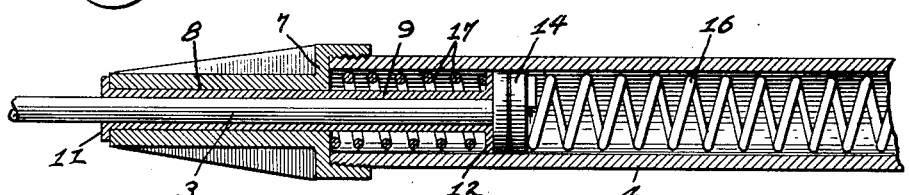
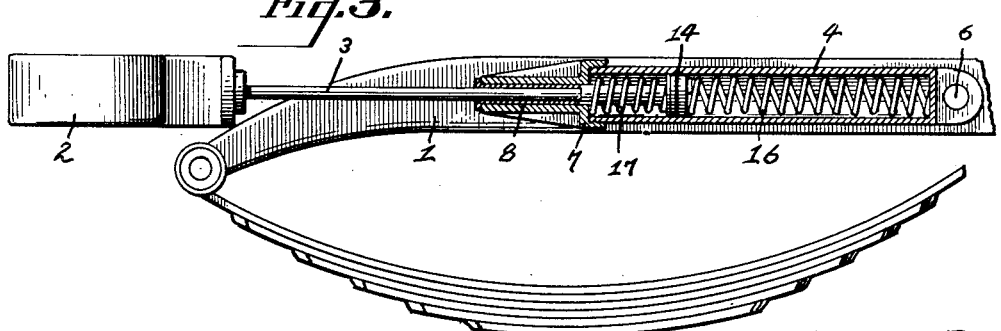
INVENTOR.
CELESTE COSTAGANNA.
By _____
ATTY.

Patented Dec. 24, 1929

1,740,576

UNITED STATES PATENT OFFICE

CELESTE COSTAGANNA, OF SAN FRANCISCO, CALIFORNIA, ASSIGNOR OF ONE-HALF TO RINALDO TREVISAN, OF SAN FRANCISCO, CALIFORNIA

AUTOMOBILE BUMPER

Application filed September 26, 1928. Serial No. 308,434.

My invention relates to improvements in automobile bumpers and the like wherein the bumper is secured upon rods which are slidably mounted in bearing members secured upon the sides of the frame of an automobile and provided with springs arranged to hold the rods and bumper in a normal position and to resiliently resist displacement of the bumper and rods either inwardly or outwardly.

The primary object of my invention is to provide an improved bumper and means for mounting the same upon an automobile or the like.

Another object is to provide an improved device which will normally hold a bumper in normal relation to the frame of an automobile and which will resiliently resist displacement of said bumper to absorb any shock or pressure imposed upon the bumper.

A further object is to provide an improved device of the character described which will permit a limited displacement of the bumper inwardly or outwardly from the frame to afford increased resiliency.

Another object is to provide an improved bumper mounting means wherein the bumper may be displaced inwardly against the pressure of a spring independently of any displacement of a second spring arranged to resist outward displacement of the bumper.

A still further object is to provide an improved construction which is simple and efficient in construction and operation and which can be installed in connection with substantially any type of frame and bumper.

I accomplish these and other objects by means of the improved device disclosed in the drawings forming a part of the present application wherein like characters of reference are used to designate similar parts throughout the specification and drawings and in which—

Fig. 1 is a plan view of the front portion of an automobile frame showing my improved bumper and mounting means as applied thereon;

Fig. 2 is a broken longitudinal section of a portion of the mounting means, the figure being drawn upon a larger scale; and Fig. 3 is a side elevation of the bumper and frame as shown in Fig. 1, the mounting means being shown in section.

Referring to the drawings, the numeral 1 is used to designate in general the frame of an automobile. A bumper 2 of any suitable type, preferably an arcuate spring bar bumper, is mounted to extend transversely across an end of the frame by means of rods 3 secured upon the ends of the bumper 2 and extending into slidable engagement with mounting members 4 secured upon the sides of the frame 1.

The mounting members consist of cylindrical body portions secured in any suitable manner upon the sides of the frame by rivets or other securing means 6. A bearing member 7 is secured upon the outer end of each cylinder and provided with an elongated bearing 8 extending axially from the end of the cylinder to receive a rod 3. A sleeve 9 is preferably slidably mounted within each bearing 8, said sleeve being somewhat longer than the bearing and being provided with flanged ends 11 and 12 arranged to limit the sliding movement of the sleeve 9 within the bearing 8. The inner ends of the rods 3 are provided with plungers 14 fitting closely with the inner walls of the cylinders and slidably movable therein.

A spring 16 is mounted within the inner portion of each cylinder in back of the plunger 14 therein to resist inward movement of said plunger and the rod 3 connected therewith. A second spring 17 is mounted within each cylinder in front of the plunger to resist outward movement of the plunger and rod. The spring 17 is preferably mounted between the inner flange 12 of the sleeve 9 and the bearing portion 7, said spring operating to normally move the sleeve inwardly to its extreme position as shown in Fig. 2 of the drawings and thereby define the normal position of the plunger 14.

In operation, the bumper 2 is normally held in operative position across the end of the frame and in spaced relation thereto, the elongated bearing 8 together with the bearing surfaces of the plungers 14 within the cylinders giving a stable and rugged support whereby vertical or transverse movement of the bumper is prevented. The position of the bumper relative to the frame 1 is determined by the positioning of the mounting members 4, and in normal position the plungers 14 are held seated against the ends of the sleeves 9 by means of the springs 16.

When the bumper strikes against an obstruction the shock is absorbed both by the resilience of the bumper itself and by pressing the rods 3 and plungers 14 inwardly against the resistance of the springs 16, thereby causing the force of such shock to be cushioned to cause the least possible damage. When the displacing force is removed, the bumper is moved back to normal position by the springs 16.

In parking automobiles, and often in other circumstances the bumper is frequently caused to overlap with the bumper or fender of another automobile or with some other obstruction, and in the case of a rigidly mounted bumper, this frequently results in extensive damage to one or both of the automobiles or other objects engaged. In my improved device, the bumper may be moved outwardly at either end against the resistance of the springs 17, thereby permitting the bumper to be displaced sufficiently to clear the obstruction without material damage. When the bumper is thus moved, the plunger 14 and rod 3 are moved together with the sleeve 9 to compress the spring 17 within the cylinder. The parts are of course returned to normal position immediately upon clearing the obstruction. The sleeve 9 limits the degree to which the spring 17 may be extended, thereby preventing said spring from counteracting the resilience and the resistance of the spring 16 when the plunger is moved inwardly.

While I have illustrated and described my invention in what I now regard as the preferred embodiment, the device may be modified in various ways without departing from the spirit of my invention. I therefore desire to avail myself of all such modifications as may fall within the scope of the appended claims.

Having thus described my invention what I claim as new and desire to secure by Letters Patent is—

1. The combination with the frame of an automobile, of a bumper extending transversely across an end of the said frame; bearing members secured upon the sides of the frame adjacent said end; rods secured to the bumper and extending into sliding engagement with the bearing members and each provided with a plunger within said bearing members; and a pair of springs mounted within each bearing member upon opposite sides of the plungers therein to resiliently resist inward and outward displacement of the rods and plungers relative to the bearing members.

2. The combination with the frame of an automobile, of a bumper extending transversely across an end of said frame; bearing members secured upon the sides of the frame adjacent said end, said members comprising cylinders closed at their inner ends and having elongated bearing portions arranged upon their outer ends; rods secured to the bumper and extending into the cylinders through the bearing portions; plungers secured upon the inner ends of the rods and slidably movable within the cylinders; and springs mounted within the cylinders upon each side of the plungers therein to resiliently resist displacement of the plungers.

3. The combination with the frame of an automobile, of a bumper extending transversely across an end of said frame; bearing members secured upon the sides of the frame adjacent said end, said members comprising cylinders closed at their inner ends and having elongated bearing portions arranged upon their outer ends; rods secured to the bumper and extending into the cylinders through the bearing portions; plungers secured upon the inner ends of the rods and slidably movable within the cylinders; springs mounted within the cylinders upon each side of the plungers therein to resiliently resist displacement of the plungers; and a sleeve slidably mounted within each bearing portion and slidably receiving the rod extending therethrough, said sleeve having flanged ends arranged to limit the movement of one of the springs.

4. The combination with the frame of an automobile, of a bumper extending transversely across an end of said frame; bearing members comprising cylinders having elongated bearing portions arranged at their outer ends; sleeves slidably mounted within the bearing portions and provided with flanged ends limiting the sliding movement of said sleeves within said bearing portions; rods secured to the bumper and extending into the cylinders through the sleeves, said rods being slidably movable within the sleeves and provided with plungers slidably movable within the cylinder; a spring mounted within the rearward portion of each cylinder in back of the plunger therein to resist inward movement of the rod and plunger; and a second spring mounted between the inner flanged end of the sleeve and the bearing portion to resist outward movement of said sleeve and plunger.

5. The combination with the frame of an automobile, of an arcuate spring bumper extending transversely across an end of said frame; bearing members secured upon the sides of the frame adjacent said end, said members comprising cylinders having elongated bearing portions arranged at their outer ends; sleeves slidably mounted within the bearing portions and provided with flanged ends limiting the sliding movement of said sleeves within said bearing portions; rods secured to the bumper and extending into the cylinders through the sleeves, said rods being slidably movable within the sleeves and provided with plungers slidably movable within the cylinders; a spring mounted within the inner portion of each cylinder in back of the plunger therein to resist inward movement of the rod and plunger; and a second spring mounted between the inner flanged end of the sleeve and the bearing portions to resist outward movement of said sleeve and plunger.

In witness whereof, I hereunto set my signature.

CELESTE COSTAGANNA.